June 14, 1949.  L. E. LIGHTON  2,472,852
FILLING AND VENTING STRUCTURE FOR STORAGE BATTERIES
Filed Nov. 14, 1945
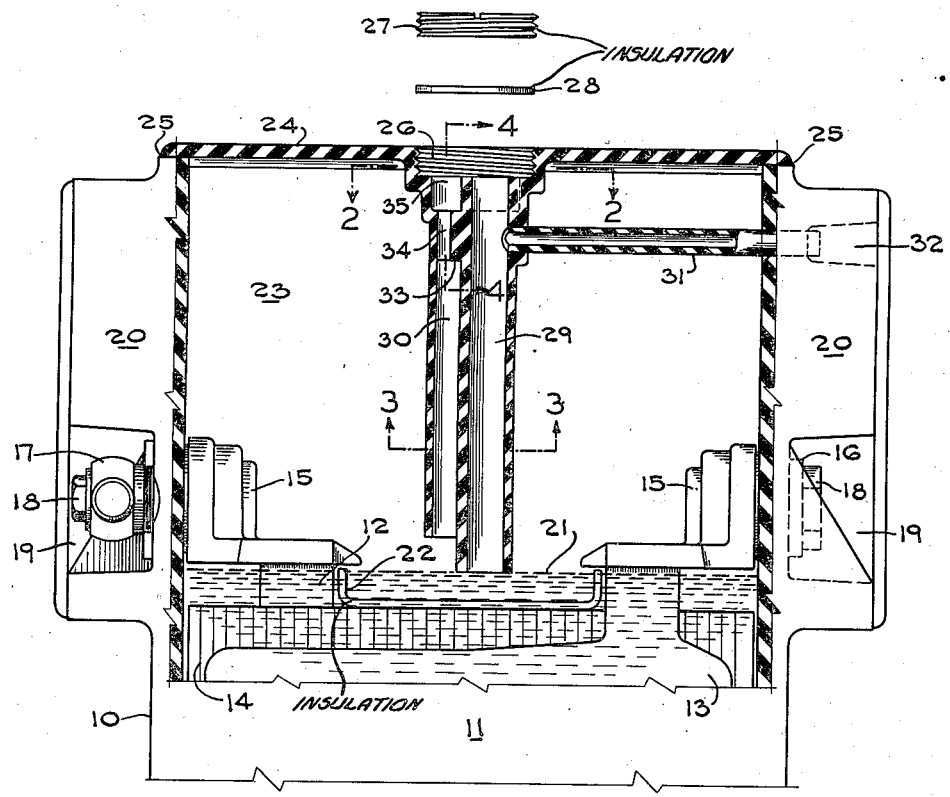
FIG. 1
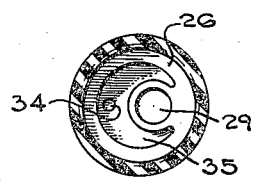
FIG. 2
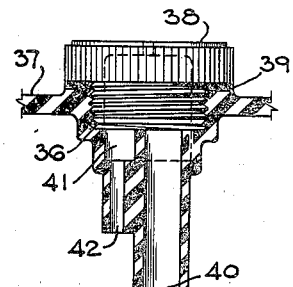
FIG. 3
FIG. 5
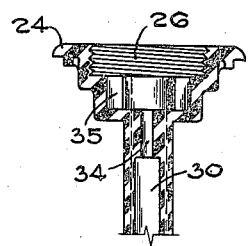
FIG. 4
INVENTOR
LESTER E. LIGHTON
BY
Augustus B. Stoughton
ATTORNEY Patented June 14, 1949

2,472,852

UNITED STATES PATENT OFFICE 2,472,852

FILLING AND VENTING STRUCTURE FOR STORAGE BATTERIES

Lester E. Lighton, Glenside, Pa., assignor to The Electric Storage Battery Company, a corporation of New Jersey Application November 14, 1945, Serial No. 628,567

7 Claims. (Cl. 136—177)

This invention relates to a filling and venting structure for storage battery cells and particularly to such a structure designed to prevent over filling of the storage battery cell.

It is among the objects of this invention to provide a new and improved non-overfill filling and venting structure which is simple in construction and gives a positive indication that the desired electrolyte level is obtained.

The filling and venting structure of this invention comprises two ducts terminating in a filling well. One of the ducts extends down to the normal electrolyte level. The second duct extends downwardly parallel to the first duct but terminates above the electrolyte level. The upper end of the second duct terminates in a cavity in the filling well in the path of the liquid being introduced into the cell and provided near the upper end thereof is a portion of restricted diameter which produces a liquid seal. When the desired electrolyte level is reached during a filling operation and the lower end of the first duct is covered, visible bubbling occurs in the cavity caused by gas escaping through the second duct and the restricted portion thereof.

For a more complete understanding of this invention reference should be had to the accompanying drawing in which:

Figure 1 is a partial front elevation of storage battery cell partly broken away and partly in section in which is incorporated the improved filling and venting structure of this invention;

Figure 2 is a sectional view taken on the line 2—2 of Figure 1 showing details of the filling well and the cavity therein;

Figure 3 is a sectional view taken on the line 3—3 of Figure 1 showing details of the duct construction;

Figure 4 is a sectional view taken on the line 4—4 of Figure 1;

Figure 5 is a partial sectional view showing the upper portion of a modified form of the filling and venting structure of this invention.

In the drawing I have shown the improved filling and venting structure of this invention embodied in a double chamber type non-spill battery having a container 10 provided with a lower chamber 11 containing the usual positive plates 12, negative plates 13 and separators 14. The plates are connected to straps 15 which in turn are connected to intercell or terminal connectors 16 and 17 respectively by means of connector bolts 18 passing through the side walls of the container 10 and terminating in recesses 19 provided in projections 20 on opposite sides of the container. Electrolyte covers the plates and separators in the lower chamber 11 to the normal level shown at 21. A separator protector 22 is shown lying between but under the straps 15.

The side walls of the container 10 project upwardly to define an upper chamber 23 which is closed by a cover 24 sealed at 25 to the upper ends of the cell walls in any suitable manner. This upper chamber is designed to receive all of the electrolyte in the lower chamber when the battery is inverted and in combination with features of the non-overfill structure of this invention produces a non-spill construction.

In the cover 24 is a cylindrical filling well 26 internally threaded to receive the removable imperforate plug 27 and its gasket 28. Below the filling well 26 there is shown the non-overfill structure of this invention comprising two ducts 29 and 30. The duct 29 terminates at its lower end at the normal electrolyte level 21 and at its upper end extends through the bottom wall or floor of the filling well 26. The expression "normal electrolyte level" as used herein refers to the maximum level to which the container should be filled with electrolyte. The diameter of duct 29 is shown sufficiently large to accommodate the tube of a hydrometer syringe. This is optional however and the diameter of duct 29 could be made smaller than shown. It should not be so small however that it will fill with liquid during a filling operation and thereby prevent venting therethrough as described hereinafter.

Provided near the top of duct 29 is a laterally disposed vent tube 31 hermetically sealed into the opening in the wall of duct 29 through which wall it passes. The opposite end of tube 31 extends through the side wall of the container and communicates with a vent manifold 32 provided in the projection 20. The manifold 32 is vented to the atmosphere by suitable means not shown. Vent tube 31 is spaced from the top of duct 29, such structure tending to prevent loss of electrolyte accidentally spilled into the ducts during inversion of the battery.

The duct 30 extends downwardly to within a short distance of the lower end of duct 29 and hence lies a short distance above the electrolyte level 21. The upper end of duct 30 passes through the floor of the filling well 26 adjacent the upper end of the duct 29. Provided in the duct 30 near the top thereof is a short section 33 having a bore or duct 34 therethrough of reduced diameter with reference to both duct 30 and duct 29. This short section terminates above in a cavity 35 formed in the floor of the filling well 26. The duct 34 is preferably so located that a section of its wall is in vertical alignment with the corresponding section of the wall of the lower portion of duct 30, whereby duct 34 and duct 30 are in eccentric relationship. This arrangement causes the liquid flowing down through duct 34 to follow the wall of duct 30 without spreading or clogging.

The length and centralized position of the ducts 29 and 30 in combination with the proportions of the upper chamber are such that in any abnormal position of the battery, e. g. tilted or inverted, the level of the electrolyte will be below the open ends of the ducts within the chamber. Hence spillage of electrolyte through either duct is avoided.

The lower end of duct 30 is located a sufficient distance above the lower end of duct 29 so that gases evolved will escape through duct 30 even when the electrolyte level is raised above the end of duct 29 by the entrained bubbles of gas or increased temperature or both. Under these conditions the evolved gases will escape through duct 30 via the space in filling well 26 under the plug 27 into the upper end of duct 29 and thence out through vent tube 31.

In carrying out a filling operation to bring the electrolyte level to the desired point, plug 27 is removed and liquid is introduced into filling well 26, being directed into cavity 35. This liquid in general passes down through cavity 35, duct 34 and duct 30 into the cell but some of it overflows into the cell through duct 29. During the filling operation the cavity 35 and duct 34 stand full of liquid providing a liquid seal against the escape of gas under the cover of the battery. This gas can escape through duct 29 and tube 31 until the normal electrolyte level is reached and the lower end of duct 29 is sealed. When liquid thus seals the lower end of duct 29, gas will be trapped in the space under the cover above the electrolyte. Any further addition of liquid will cause the liquid to rise in duct 29 and the pressure of the gas trapped under the cover to increase. This continues until the increased pressure is sufficient to overcome the head of liquid in the duct 34 and the cavity 35. Gas will then bubble out through the liquid in cavity 35 to give a visible indication that the filling operation is completed.

The diameter of the bore 34 is chosen to cause liquid passing down from cavity 35 to flow in a stream sufficiently small to avoid filling duct 30 with liquid. Such filling would produce an abnormal head of liquid to be overcome by the increased pressure of the trapped gas, thereby causing an excessive rise of liquid in duct 29 and a tendency to overflow into vent tube 31. It has been found by tests that satisfactory results are obtained when the ratio of the diameters of duct 30 to duct 34 is 3 to 1 or over. In the selection of the size of duct 34 in accordance with this ratio, the filling and sealing function of duct 34 should be borne in mind and a compromise struck between quick filling and a good liquid seal.

In Figure 5 is shown a modified form of the filling and venting structure of this invention. This modified form is suitable for application to batteries which are not inverted or tilted for any length of time during use. Such batteries include the usual starting, lighting and ignition type batteries for automobiles or larger batteries of the type used for industrial trucks. Referring to Figure 5 it will be observed that a filling well 36 is provided in a cover 37 which is sealed on the battery container in a suitable manner. The filling well 36 is internally threaded to receive a perforated vent plug 38 and its associated gasket 39. Extending downwardly from the floor of the filling well 36 are walls defining a filling duct 40. The lower end of duct 40 lies at the normal electrolyte level similar to duct 29 Figure 1. As in the case of duct 29, the duct 40 is of such diameter as to accommodate the tube of a hydrometer syringe but a smaller diameter duct may be employed. In the floor of the filling well 36 is a cavity 41 and opening into the bottom of the cavity 41 is a duct 42. It will be observed that the duct 42 is relatively short and the lower end thereof will therefore communicate with space under cover 37 above the normal electrolyte level.

In operation, filling liquid added to filling well 36 is directed into cavity 41 and will primarily pass downwardly through the duct 42 but some will overflow into the cell through duct 40. When the normal electrolyte level is reached the lower end of duct 40 will be covered and liquid will rise in the duct 40 thereby increasing the pressure of the gas trapped under the cover. This increase in pressure will cause the gas to bubble out through the liquid in the duct 42 and the cavity 41 thereby giving a visible bubbling indication that the filling operation is completed.

It is to be observed that this modification shown in Figure 5 differs from the construction shown in Figure 1 in that the duct 30 of Figure 1 is eliminated, the duct 42 corresponding to the duct 34 of Figure 1. Also the vent tube 31 is eliminated and the battery is vented through the perforated vent plug in the well known manner.

From the foregoing it will appear that there is provided in accordance with this invention a simple effective non-overfill structure which is free of movable valve members and the like and by which a positive visible bubbling indication is given when a filling operation is completed.

While specific embodiments of this invention have been illustrated and described, modifications thereof will occur to those skilled in the art and it is intended in the appended claims to cover all such modifications within the true spirit and scope of this invention.

I claim:

1. A non-overfill filling and venting structure for a double chamber type non-spill battery having a container, the lower portion of which contains storage battery elements and electrolyte and the upper portion of which is adapted to hold all of the electrolyte when said battery is inverted, comprising a cover sealed to the upper walls of said container, a filling well in said cover, an imperforate plug closing said filling well from above, a floor in said filling well, a duct defined by walls extending from the floor of said filling well down to the normal electrolyte level of said battery when said battery is in an upright position, a second filling duct defined by walls extending from the floor of said filling well down to a point in proximity to but above the lower end of said first mentioned duct, said second duct having the opening thereof at its upper end restricted by a section of reduced diameter, whereby liquid passing therethrough forms a liquid seal the lower end of both of said ducts being constructed to lie above the electrolyte level when said battery is inverted and a vent passage establishing communication between the upper end of said first mentioned duct and the external atmosphere.

2. In a non-overfill filling and venting structure for a storage battery assembled in a container for electrolyte and provided with a sealed-on cover, the combination of a filling well in the cover having a floor, a duct defined by walls extending from the filling well down to the normal electrolyte level, a second duct defined by walls extending from the floor of said well down to a point in proximity to but above the lower end of said first mentioned duct, said second mentioned duct having a portion of larger diameter and a portion of smaller diameter, said portion of smaller diameter lying above said portion of the larger diameter, whereby liquid passing through said portion of smaller diameter forms a liquid seal, said portion of small diameter being positioned eccentric to said portion of larger diameter so that one of its bounding walls is in alignment with the bounding wall of said portion of large diameter, whereby liquid introduced into said second mentioned duct follows the wall thereof into the container.

3. In a storage battery including a container adapted to receive electrolyte, a filling and venting structure comprising a first duct terminating at the normal electrolyte level and communicating with the external atmosphere to provide an escape for air during filling as long as the electrolyte level is below normal, a second duct for filling the battery and venting it when electrolyte level is normal or above, at least a portion of said second duct being of reduced diameter, whereby liquid passing therethrough forms a liquid seal and cavity means associated with the upper portion of said second duct.

4. In a storage battery including a container adapted to receive electrolyte, a filling and venting structure comprising a well in the container top, a first duct extending from said well to the normal electrolyte level to provide an escape for air during filling as long as electrolyte level is below normal, a second duct extending from said well for filling the battery and venting it when electrolyte level is normal or above, said second duct being provided with a portion of reduced diameter spaced below the floor of said well, whereby liquid passing therethrough forms a liquid seal.

5. In a storage battery including a container adapted to receive electrolyte, a filling and venting structure of the non-overfill, non-spill type comprising a first duct terminating at the normal electrolyte level and communicating with the external atmosphere to provide an escape for air during filling as long as electrolyte level is below normal, a second duct for filling the battery and venting it when electrolyte level is normal or above, said second duct terminating near but above the normal electrolyte level, and having an upper portion of reduced diameter, whereby liquid passing therethrough forms a liquid seal, cavity means associated with the upper portion of said second duct and defined by the walls of said duct and said portion of reduced diameter, the space within said container above the normal electrolyte level accommodating the electrolyte when the battery is inverted.

6. In a storage battery including a container adapted to receive electrolyte, a filling and venting structure of the non-overflow, non-spill type comprising a well in the container top, a first duct extending from said well to the normal electrolyte level to provide an escape for air during filling as long as electrolyte level is below normal, a second duct extending from said well for filling the battery and venting it when electrolyte level is normal or above, and a cavity in the floor of said well for directing flow of added liquid into said second duct, the upper portion of said second duct being of reduced diameter, whereby liquid passing therethrough forms a liquid seal, the space within said container above the normal electrolyte level accommodating the electrolyte when the battery is inverted.

7. In a storage battery including a container adapted to receive electrolyte, a filling and venting structure of the non-overflow, non-spill type comprising a well in the container top, a first duct extending from said well to the normal electrolyte level to provide an escape for air during filling as long as electrolyte level is below normal, a vent tube connecting said first duct with the external atmosphere and being offset from the upper end of the duct, a second duct extending from said well for filling the battery and venting it when electrolyte level is normal or above, the upper portion of said second duct being of reduced cross section, whereby liquid passing therethrough forms a liquid seal, the space within said container above the normal electrolyte level accommodating the electrolyte when the battery is inverted, and imperforate means for closing said well.

LESTER E. LIGHTON.

REFERENCES CITED

The following references are of record in the file of this patent:

UNITED STATES PATENTS

| Number | Name | Date |
| --- | --- | --- |
| 2,306,569 | Sandusky | Dec. 29, 1942 |
| 2,401,448 | Woodbridge | June 4, 1946 |